United States Patent [19]

Kitai et al.

[11] Patent Number: 4,655,583

[45] Date of Patent: Apr. 7, 1987

[54] APPARATUS FOR TRANSPORTING A WEB OF PHOTOSENSITIVE MATERIAL IN A PHOTO PRINTER

[75] Inventors: Makoto Kitai; Takashi Omori, both of Kyoto, Japan

[73] Assignees: Kabushiki Kaisha Shashin Kogyo; Dainippon Screen Mfg. Co., Ltd., both of Kyoto, Japan

[21] Appl. No.: 853,750

[22] Filed: Apr. 18, 1986

[30] Foreign Application Priority Data

May 7, 1985 [JP] Japan .............................. 60-66542[U]
May 31, 1985 [JP] Japan .................................. 60-116399

[51] Int. Cl.⁴ ............................................. G03B 29/00
[52] U.S. Cl. ....................................... 355/29; 355/50; 355/64
[58] Field of Search ........................ 355/28, 29, 50, 64

[56] References Cited

U.S. PATENT DOCUMENTS

| | | | |
|---|---|---|---|
| 3,516,741 | 6/1970 | Thaddey | 355/29 X |
| 4,136,946 | 1/1979 | Nishimoto | 355/28 |
| 4,174,174 | 11/1979 | Hunter, Jr. et al. | 355/64 X |
| 4,299,458 | 11/1981 | Burton | 355/64 X |
| 4,429,988 | 2/1984 | Okabe | 355/28 |
| 4,444,485 | 4/1984 | Kogane | 355/29 |
| 4,447,146 | 5/1984 | Kogane et al. | 355/28 |
| 4,605,300 | 8/1986 | Thaddey | 355/29 |
| 4,618,251 | 10/1986 | Yanagawa et al. | 355/28 |

Primary Examiner—Richard A. Wintercorn
Attorney, Agent, or Firm—Hayes, Davis & Soloway

[57] ABSTRACT

In a photo printer, a web of photosensitive material is transported in proportion to a magnification ratio to a focusing plane movable along an optical axis, the web is exposed to a photo image, and the exposed web is then fed out. The printer includes a first magazine to load the web of the photosensitive material in a rolled form and to feed the web over a desired length, moving roller means for transporting the web along a path curved downwardly in a U-shape, exposure frame means composed in combination of a press pan and a mask frame and movable along the optical axis, nipping roller means provided in a pair on each of the front and rear sides of the exposure frame means and cooperated to transport the web along the focusing plane, exhaust feeding means for feeding out the exposed web, and a second magazine for receiving the exposed web from the exhaust feeding means.

9 Claims, 5 Drawing Figures

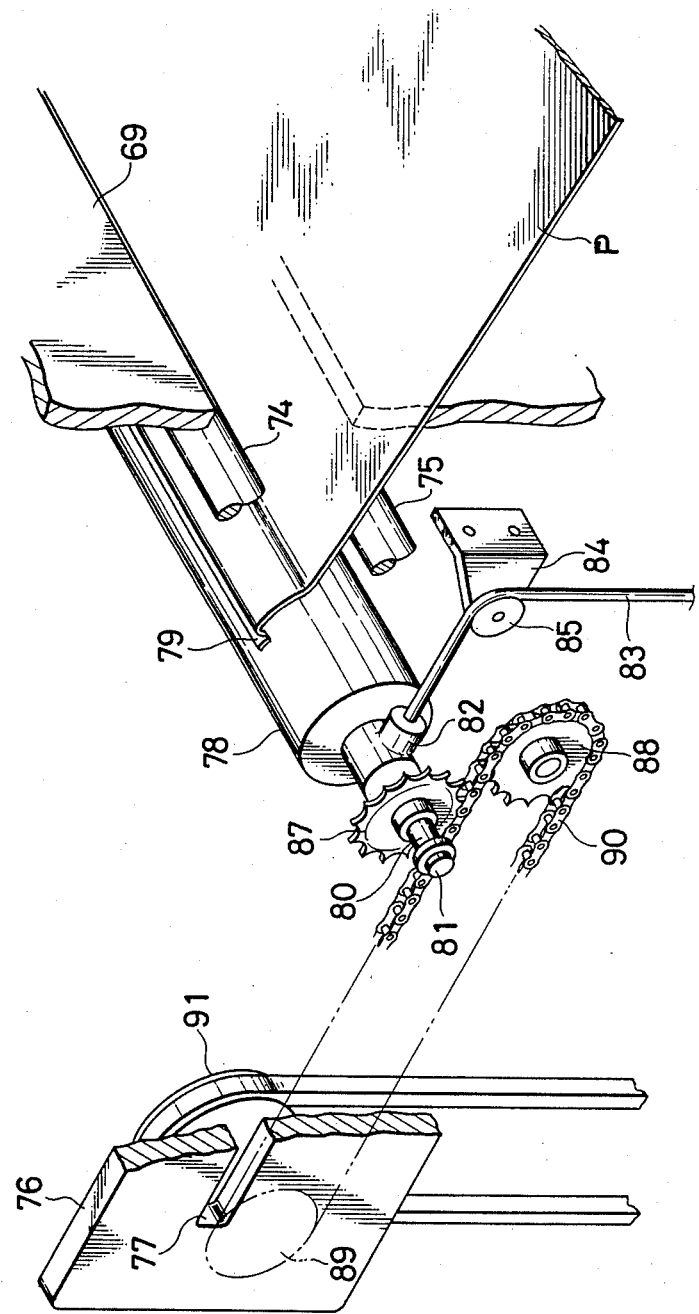

APPARATUS FOR TRANSPORTING A WEB OF PHOTOSENSITIVE MATERIAL IN A PHOTO PRINTER

BACKGROUND OF THE INVENTION (1) Technical Field of the Invention

This invention relates to a photo printer for projecting an image of an original picture onto a photosensitive material through a lens so as to expose the photosensitive material to the thus-reproduced optical image, and more specifically to a photo printer for feeding, in proportion to a magnification ratio, a photosensitive material loaded in a rolled form within a magazine provided at a fixed position onto a focusing frame movable in the direction of an optical axis, setting it on the focusing frame, exposing it and then receiving the exposed photosensitive material within a receiving magazine.

(2) Description of the Prior Art

Automated photo printers are now widely used in printing work, in which color sensitive paper sheets are exposed to optical images of negative color original films so as to reproduce color pictures. In each of such photo printers, a web-like color sensitive paper is stored in a rolled form within a magazine. The color sensitive paper is fed out to a focusing plane as needed, so that the color sensitive paper is exposed to an image of an original, followed by feeding-out of the thus-exposed paper to a receiving side. Two types of photo printers are known depending on the manner of the feeding-out. In one type of photo printers, an exposed paper web is wound up into a roll while maintaining its web-like form (roll-to-roll mode). In the other type of photo printers, an exposed paper web is cut into sheets, followed by their storage in the sheet-like form within a magazine (roll-to-sheet mode).

Either one of these modes is chosen depending on the production scale of a work shop where a photo printer is used, the type of processing of exposed paper, etc. In a large-scale shop in which a roll of color sensitive paper is used in a continuous operation, a high level of work efficiency can be achieved when the roll-to-roll mode is adopted to permit feeding of exposed paper in a rolled form to a processor. On the other hand, the use of the roll-to-sheet mode is reasonable for a small-scale shop where color sensitive paper is not consumed so much as the large-scale shop.

However, the demand for color printing is not always high even in a large-scale shop. It is thus necessary to use the "roll-to-sheet mode" from time to time in the large-scale shop, although the "roll-to-roll mode" is usually employed there. Since there has not been available any color photo printer which enables to practice both types of the modes, use of both modes results automatically in the installation of two types of photo printers, one of the "roll-to-roll mode" and the other of the "roll-to-sheet mode", in other words, double investments. This is certainly uneconomical.

There have also been known photo printers, each of which allows to adjust the magnification ratio upon projection of an image so as to obtain a reproduced picture of a desired size. To achieve this function, it is indispensable to adopt such a design that desired two of an original film, a lens and a focusing plane are movable in the direction of the optical axis. Since it is rather common to load different original films one after another in general printing work, it is advantageous to maintain the loading position of such original films at the same position for the convenience of the operation. It is hence preferred to move the lens and focusing plane. If the focusing plane with a color sensitive paper held thereon is moved and the magazine with a roll of color sensitive paper stored therein is fixed, it is difficult to transport the web of color sensitive paper (hereinafter called "paper web" or "web" for the sake of brevity) from the magazine to the focusing plane. This requires to move the magazine and focusing plane as unitary members, leading to an disadvantage that the moving part is increased in both bulk and weight.

SUMMARY OF THE INVENTION

With the foregoing in view, an object of this invention is to provide a photo printer which enables to exposes a paper web efficiently to an image of an original film at a desired magnification ratio.

Another object of this invention is to provide a photo printer which can practice both "roll-to-roll mode" and "roll-to-sheet mode".

A further object of this invention is to provide a photo printer equipped with a transportation mechanism for transporting a paper web from a magazine, which is provided at a fixed position, to a focusing plane movable in the direction of an optical axis and receiving the paper web in a receiving magazine subsequent to its exposure.

A still further object of this invention is to provide a photo printer equipped with a transportation system which enables to reduce the loss of a paper web.

In order to achieve the above-described objects, the present invention provides, in one aspect thereof, a photo printer of such a type that a web of photosensitive material is transported in proportion to a magnification ratio to a focusing plane movable along an optical axis, the web is exposed to a photo image, and the thus-exposed web is fed out to a receiving side, comprising:

a first magazine provided at a fixed position and adapted to load the web of the photosensitive material in a rolled form therewithin and to feed the web over a desired length;

moving roller means for transporting the web, which has been fed from the first magazine, along a path curved downwardly in a U-shape, the height of the bottom of said U-shaped path being adjustable;

exposure frame means composed in combination of a press pan and a mask frame, which are adapted to hold the web fed through the moving roller means, and movable along the optical axis;

nipping roller means provided in a pair on each of the front and rear sides of the exposure frame means and cooperated to transport the web along the focusing plane;

exhaust feeding means for feeding out the web, which has passed through the exposure frame means, to the receiving side; and a second magazine for receiving the web fed out from the exhaust feeding means.

The above and other objects, features and advantages of this invention will become apparent from the following description and appended claims, taken in conjunction with the accompanying drawings.

BRIEF DESCRIPTION OF THE DRAWINGS

In the accompanying drawings:

FIG. 3 is a fragmentary perspective view of the receiving magazine; and

DETAILED DESCRIPTION OF THE INVENTION AND PREFERRED EMBODIMENT

Figure 1:
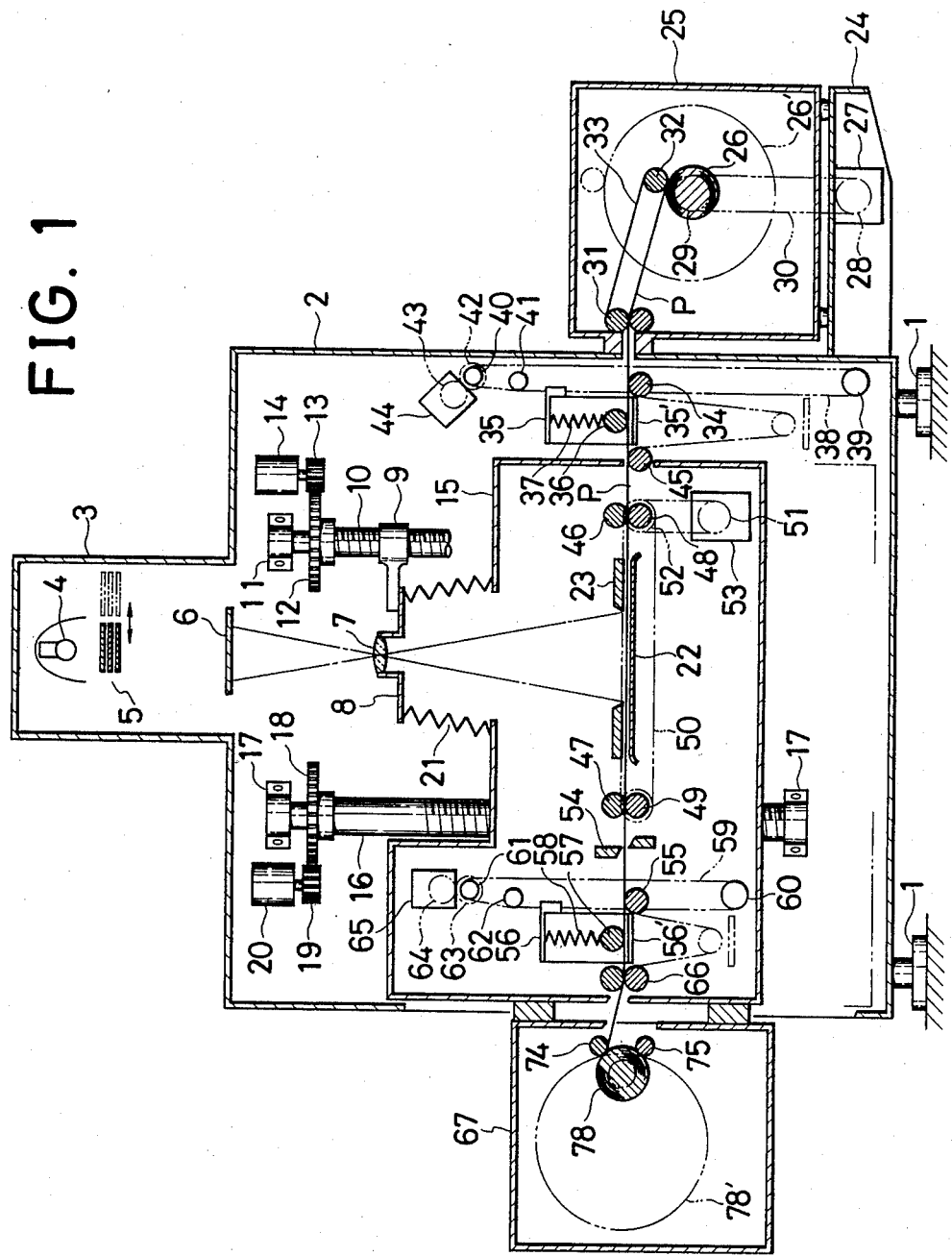
FIG. 1 is a sectional front view of a photo printer according to one embodiment of this invention.

Referring first to FIG. 1 which schematically illustrates the preferred embodiment of this invention, a lamp 4 and a set of color correction filters 5 are housed in a lamp head 3 provided on the top of a frame 2 which is supported by a plurality of pedestals 1. The set of filters 5 includes plural kinds of color filters such as magenta filter, cyan filter, yellow filter and the like. One or more of the color filters are inserted into an optical axis as needed, thereby controlling the color of the illumination light.

At a fixed position underneath the lamp head 3, an original color film 6 is set. An optical image of the original color film 6 is projected by a lens 7 onto a focusing plane located in a lower part of the frame 2. A lens board 8 on which the lens 7 is mounted is provided with a nut 9 which is kept in engagement with an externally-threaded shaft 10 supported on bearings 11 (the upper one is only shown). By rotating the shaft 10 through gears 12,13 by means of a motor 14, the lens board 8 is caused to move upwardly or downwardly along unillustrated guide rails.

In a lower part of the frame 2, an inner frame 15 equipped internally with an exposure frame is provided in such a way that the inner frame 15 is movable up and down along unillustrated guide rails. The inner frame 15 is provided with a nut (not shown) which is kept in engagement with an externally-threaded shaft 16 supported on bearings 17. The inner frame 15 is thus caused to move upwardly or downwardly by rotating the externally-threaded shaft 16 by a motor 20 via gears 18,19.

An opening is formed through the upper wall of the inner frame 15 around a point through which the optical axis extends. Bellows 21 are provided between the peripheral edge of the opening and the lens board 8.

In a middle part of the inner frame 15, a press pan 22 and a trimming mask frame 23 are provided in such a positional relation that the latter lies over the former. A focusing plane is formed between the press pan 22 and trimming mask frame 23 so as to hold a paper web P on the focusing plane.

A shelf 24 extends out from the right side wall of the frame 2, on which a magazine 25 storing an roll of unexposed paper web supported on an unillustrated shaft is mounted. A circle 26 indicates the minimum diameter of the roll after consumption of the paper web whereas a circle 26', which is shown by a chain line, indicates the maximum diameter of the roll upon its loading as a fresh roll.

A sprocket 28 is fit on the drive shaft (not shown) of a motor 27 provided in the shelf 24 while another sprocket 29 is provided with the roll 26. A chain 30 is applied between the sprockets 28 and 29. By driving the motor 27 and causing the roll 26 to rotate as needed, the web P is fed out from the magazine 25.

A feeding gate of the magazine 25 is provided with a pair of feed rollers 31. By connecting a roller 32, which is maintained in contact with the peripheral wall of the roll 26 and is thus driven by the roll 26, to one of the rollers 31 (the upper roller 31 in the illustrated embodiment) by means of a chain 33, the rollers 31 are driven in proportion to each feeding length of the web P and the web P is fed into the frame 2.

The web P which has been fed in the frame 2 is guided into the inner frame 15 by way of a height matching mechanism. The height matching mechanism is composed of a guide roller 34 provided at fixed position in the frame 2, elevator means 35, and a guide roller 45 provided on the inner frame 15.

The elevator means 35 is equipped with a bridge piece 35', a pressure roller 36, and a spring 37 biasing the roller 36 downwardly, and is supported movably up and down along unillustrated guide rails. A drive chain 38 wrapped on sprockets 39,40,41, which are all provided within the frame 2, is connected to the elevator means 35. By driving a motor 44, the elevator means 35 is caused to move up and down by way of gears 42 and 43 which are provided coaxially with the sprocket 40 and motor 44 respectively.

The height matching mechanism ensures to transport the paper web P between the guide rollers 34 and 45, even when the heights of the guide rollers 34,35 are not at the same level unlike their positions depicted in FIG. 1. Use of such a height matching mechanism is required because the height of the inner frame 15 varies depending of the magnification ratio.

Upon initial setting, the inner frame is set at such a height that the rollers 45 and 34 assume the same level. Then, the elevator means 35 is lifted until the bridge piece 35' is interposed between the roller 34 and roller 45. The paper web P is thereafter inserted and the elevator means 35 is caused to move downwardly so as to bend the web P into a U-shape.

As the inner frame 15 is caused to move upwardly in accordance with a magnification ratio, the tension of the web P increases. The roller 36 is hence caused to move upwardly against the force of the spring 37, thereby permitting movement of the inner frame 15. When the inner frame 15 is caused to move downwardly on the other hand, the web P is applied with a suitable degree of tension so long as the downward movement of the inner frame 15 is within the stroke of the roller 36. Beyond that, slack is developed in the U-shaped part of the web P. This slack can however be tolerated without need for any special means.

The web, which has been fed in the inner frame 15 from the guide roller 45, is held by nipping rollers 46,47 provided in pairs on the front and rear sides of the exposure plane, respectively. Sprockets 48,49 are coaxially attached to these rollers and a chain 50 is wrapped on these sprockets 48,49 so as to drive the two sets of nipping rollers 46,47 in an interlocked fashion. Although the two sets of rollers may be rotated at the same revolution speed, it is preferred to rotate the rear-side rollers 47 somewhat faster than the front-side rollers 46 so that the tension of the web P is increased to maintain the paper web P in a completely flat state on the exposure plane. To achieve this, it is only necessary to provided fewer teeth with the rear-side sprocket 49 than the front-side sprockets 48.

In addition, the sprocket 48 is in the form of a double sprocket. A chain 52 is applied between the sprocket 48 and a sprocket 51 fixed on the shaft of the motor 53 which is arranged below the sprocket 48, thereby driving the nipping rollers 46,47 and feeding the web P.

After the nipping rollers 47, a cutter device 54 equipped with a pair of guillotine blades in an up and down relation is provided. The web P is fed through the gap between the two blades. When the exposed web is received in a rolled form within the receiving magazine, the cutter device 54 is not actuated. When the exposed web is cut into sheets, the cutter device 54 is actuated by an unillustrated drive mechanism.

After the cutter device 54, a guide roller 55 and nipping rollers 66 are provided. The nipping rollers 66 serve to feed out the exposed web or sheets. An elevator means 56 is interposed between the rollers 55 and 66. Similar to the above-described elevator means 35, the elevator means 56 is composed of a bridge piece 56', a pressure roller 57 and a spring 58 which urges the roller 57 downwardly. The elevator means 56 is designed in such a way that it is movable in the vertical direction along unillustrated guide rails. A chain 59, which is wrapped on sprockets 60,61,62 provided in the inner frame 15, is connected to the elevator means 56. A gear 63 provided on the shaft of the sprocket 61 is maintained in meshing engagement with a gear 64 of a motor 65. The elevator means 56 is thus caused to move vertically by driving the motor 65.

The elevator means 56 is provided to adjust the timing upon winding up the exposed web P in the uncut form in the magazine 67. Its operation will be described later in this specification.

Figure 2:
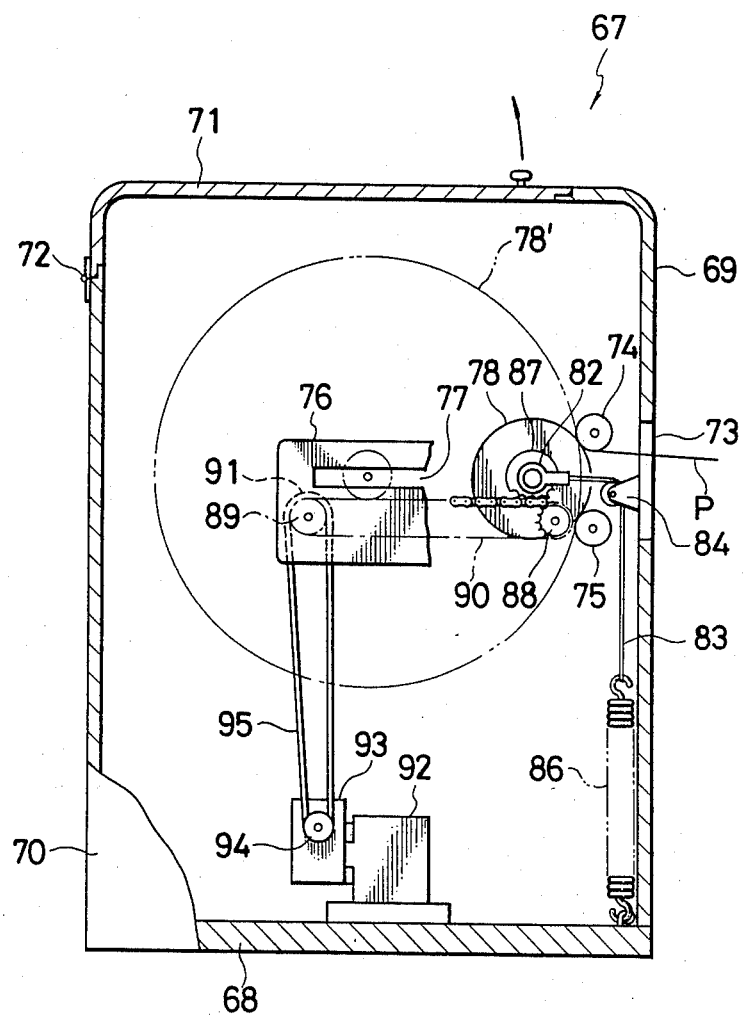
FIG. 2 shows on an enlarged scale a receiving magazine of the photo printer, said receiving magazine being adapted to receive each exposed paper web.

The detailed construction of the magazine 67 is illustrated in FIGS. 2 and 3.

The magazine 67 is composed of a base 68, side panels 69, and front and rear panels 70. A lid 71 is provided by way of a hinge 72 as the top wall of the magazine 67. The right side panel 69 defines therethrough an opening 73 through which the exposed paper web P is inserted. Inside the opening 73, a pair of guide rollers 74,75 are rotatably provided.

A pair of spool guides 76, which extends in parallel to the front and rear panels 70 and define horizontal guide slots 77, are fixedly provided within the magazine 67.

As illustrated in FIG. 3, a spool 78 supported on the spool guides 76 defines at a longitudinal central part thereof a slit 79 in which the leading edge of the exposed paper web P is inserted. The spool 78 terminates in journals 80 at both ends thereof. On each of the journals 80, a clip 82, sprocket 87 and retaining ring 81 are attached in order from the inside. However, it is necessary to provide the sprocket 87 with only one of the journals 80. The clips 82 are fit rotatably on their corresponding journals 80, whereas the socket 87 and retaining rings 81 are fixedly attached to the their corresponding journals 80.

The journals 80 are inserted, at portions between the sprocket 87 and its associated ring 81 (on the opposite side where no sprocket is provided, between the clip 82 and its associated ring 81), in the slits 77 of the guides 76 so that the spool 78 is supported slidably along the slits 77.

A cord 83, which is fastened at the upper end thereof to the clip 82, is connected to a spring 86 via a pulley 85 which is mounted by a holder 84 on the inner wall of the side panel 69 at a position close to the opening 73. The other end of the spring 86 is hooked on the base 68. Accordingly, the spool 78 is pulled toward the opening 73 and pressed against the pair of guide rollers 74,75 by the spring 86 via the cord 83.

Inside the spool guide 76 in which the journal 80 provided with the sprocket 87 is inserted, two sprockets 88,89 are provided. An endless chain 90 is wrapped on the sprockets 88,89. The chain 90 is provided at such a position that when the spool 78 moves along the slits 77, the sprocket 87 is allowed to mesh with and roll on the chain 90.

An endless belt 95 is applied between a pulley 91 fixed on the shaft of the sprocket 89 and another pulley 94 which is driven by a motor 92 provided on the base 68 by way of a reduction gear device 93. When the magazine 67 does not have sufficient internal space, the motor 92 and reduction device 93 may be provided outside the magazine 67 and the drive shaft of the reduction gear device 93 may be extended into the magazine 67.

When the pulley 94 is rotated clockwise in FIG. 2, the endless chain 90 is also rotated in the same direction whereas the sprocket 87, which is maintained in meshing engagement with the endless chain 90, and spool 78 are rotated couterclockwise, namely, in the direction that the web P inserted downwardly into the slit 79 of the spool 78 is wound up on the spool 78.

When no web is wound up on the spool 78, the spool 78 is maintained, at its own peripheral wall, in contact with the guide rollers 74,75 and hence assumes a position closest to the opening 73. For insertion of the leading edge of the exposed web P into the slit 70 of the spool 78, it is merely required to feed the leading edge of the web P into the slit 79 without need for any special setting jig or adopter because the distance from the opening 73 to the spool 78 is small enough support the web by its own stiffness in a cantilevered fashion. A suitable guide plate or guide wire may however be additionally provided where the stiffness of a web is low or a web is curled so that the insertion of the web is difficult.

When the slit 79 does not face toward the opening 73 upon insertion and setting of the paper web P, the motor 92 is driven to rotate the spool 78 over a desired angle. Since the spool 78 is rotated at a relatively low speed by way of the reduction device 93, it is easy to direct the slit 79 in the desired direction.

As the spool 78 takes up the web P thereon and its effective diameter increases, the spool 78 is caused to move toward the central part of the magazine along the guide slits 77 against the force of the spring 86. In FIG. 2, a chain line circle 78' indicates the diameter of the web P when the web P has been wound up over its maximum length.

To facilitate removal of the spool 78 from the magazine 67 after the web P has been taken up on the spool 78, the guide plates 76 must have such a structure that the journals 80 of the spool 78 can be taken out of their corresponding slits 77. Two different embodiments of such a structure are illustrated respectively in FIGS. 4a and 4b.

Figure 4A:
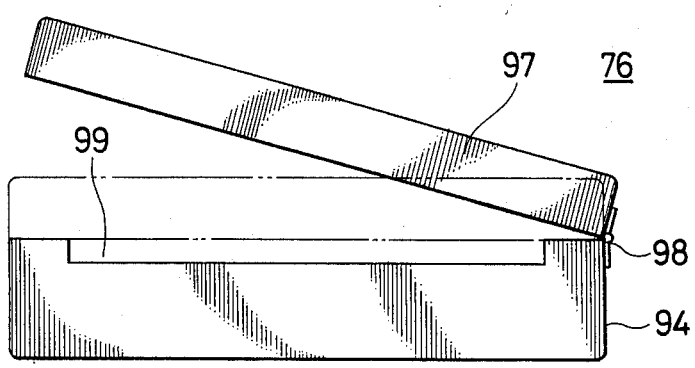
FIG. 4a and 4b show guide panels of different embodiments, each of which is adapted to guide a winding shaft of the receiving magazine.

The guide plate 76 depicted in FIG. 4a is separated into a lower plate 94 and an upper plate 97 along the slit. The lower and upper plates 94,97 are connected by a hinge 98. When holding a spool therein, the upper plate 97 is brought into its closed position which is indicated by a two-dot chain line, and a recess 99 formed in the lower plate 94 defines a guide slit for the spool.

Figure 4B:
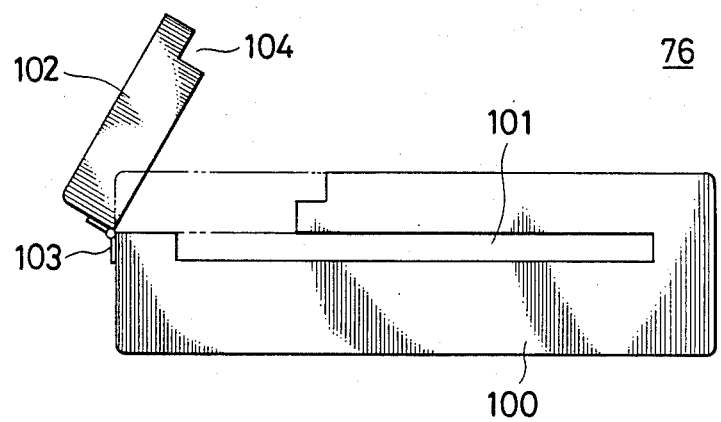

In the guide plate 76 depicted in FIG. 4b, a guide plate 100 equipped with a slit 101 is rendered movable only at a portion 102 owing to the provision of a hinge 103. A free end portion of the portion 102 is formed into a step 104, which is brought into engagement with a matching step formed on the side of the plate 100.

In the embodiments shown respectively in FIGS. 4a and 4b, the movable parts are connected to guide plates by means of the hinges. The movable parts and guide plates may take separated structures, provided that they are connected to each other by dowels.

The photo printer of this invention, which has the above-described construction, operates in the following manner.

First of all, the height of the inner frame 15 is adjusted to bring the guide roller 45 provided on the inner frame 15 into the same level as the guide roller 34 provided on the inner frame 15. The two sets of elevator means 35,56 are then adjusted to bring their respective bridge pieces 35',56' into the same level as the guide roller 34.

A roll of unexposed paper web is loaded in the supply-side magazine 25. The web is paid out from the roll and is caused to extend through the elevator means 35, exposure plane, cutter device 54 and elevator means 56 and the leading edge of the web is connected to the spool 78 of the receiving-side magazine 67.

This loading of the web can be automatically performed provided that the travelling path of the web from the magazine 25 to the nipping rollers 66 is maintained straight by the above-described height adjustments. It is therefore unnecessary to go through with such a cumbersome operation that upon loading, the cover of a photo printer is opened and the web is manually set therein. Since the web is isolated from the ambient light, it is possible to avoid the loss of some leading part of the web which loss often occurred in conventional photo printers.

The motor 27 is then driven to feed out the web P from the magazine 25. At the same time, the elevator means 35 is caused to move downwardly so as to bend the web downwardly between the guide rollers 35 and 35.

The original color film 6, which is to be reproduced, is set in the upper part of the frame 2, and the motors 14,20 are driven to shift the lens board 8 and inner frame 15 to a position corresponding to a desired magnification ratio.

The web P, which has been fed in via the elevator means 35 and guide roller 45, is transported by the two sets of nipping rollers 46,47 driven by the motor 53 while being held on the exposure frame composed of the press pan 22 and trimming mask 23. When a desired portion of the web has been set on the exposure plane, the transportation of the web is stopped and the lamp 4 is lit for a desired period of time, thereby exposing the web.

After completion of the exposure, the motor 53 is driven again to feed out the exposed web from the exposure frame. At this time, the roller 36 of the elevator means 35 is caused to move upwardly against the spring 37. The roller 36 returns to its lower position when the web is fed again from the magazine 25. On the receiving side on the other hand, the nipping rollers 66 and spool 78 of the magazine 67 are rotated suitably in response to transportation of the web from the exposure frame, whereby the web is taken up. Although this drive of the nipping rollers 66 and spool 78 may be synchronized with transportation of the web, it is not absolutely necessary to adopt such a synchronized drive method because the roller 57 is allowed to move vertically and the web is flexible.

If the revolution speed of the spool 78 is set at a constant rate, the feeding speed of the web varies when the effective diameter of the spool 78 changes owing to the web wound up thereon. It is therefore desirable to drive the spool 78 by way of a suitable adjusting device, for example, a friction clutch.

When it is desired to feed out the exposed paper web in the form of a sheet cut in a desired size, the elevator means 56 is caused to move upwardly to a position where the bridge piece 56 is aligned with the feeding path of the web. After exposure of the web, the nipping rollers 46,47 are driven to feed the thus-exposed paper web, and the web is cut by means of the cutter device 64 at a position apart by a desired distance from the leading edge of the web. The thus-cut portion of the web is transported by the nipping rollers 66 into the magazine 67. A magazine for cut sheets may take a box-like structure which does not have such spool and driving drive mechanism as shown in FIG. 2.

Having now fully described the invention, it will be apparent to one of ordinary skill in the art that many changes and modifications can be made thereto without departing from the spirit or scope of the invention as set forth herein.

We claim:

1. A photo printer of such a type that a web of photosensitive material is transported in proportion to a magnification ratio to a focusing plane movable along an optical axis, the web is exposed to a photo image, and the thus-exposed web is fed out to a receiving side, comprising:
    a first magazine provided at a fixed position and adapted to load the web of the photosensitive material in a rolled form therewithin and to feed the web over a desired length;
    moving roller means for transporting the web, which has been fed from the first magazine, along a path curved downwardly in a U-shape, the height of the bottom of said U-shaped path being adjustable;
    exposure frame means composed in combination of a press pan and a mask frame, which are adapted to hold the web fed through the moving roller means, and movable along the optical axis;
    nipping roller means provided in a pair on each of the front and rear sides of the exposure frame means and cooperated to transport the web along the focusing plane;
    exhaust feeding means for feeding out the web, which has passed through the exposure frame means, to the receiving side; and
    a second magazine for receiving the web fed out from the exhaust feeding means.

2. A photo printer as claimed in claim 1, wherein the moving means comprises:
    a first guide roller arranged in alignment with a position to which the web is fed in from the first magazine;
    a second guide roller movable together with the exposure frame means and arranged in alignment with a plane in which the web is held in the exposure frame means; and
    a moving roller disposed between the first and second guide rollers and adapted to guide the web along the U-shaped path.

3. A photo printer as claimed in claim 2, wherein the moving roller is movable to a point somewhat apart from the web when the two guide rollers are positioned at the same height to allow the web to travel straight and a bridge piece movable together with the moving roller and interposed between the two guide rollers is arranged on the side opposite to the moving roller relative to the web.

4. A photo printer as claimed in claim 2, wherein said photo printer is additionally equipped with a spring by which the moving roller is biased toward the web.

5. A photo printer as claimed in claim 1, wherein the exhaust feeding means comprises:
   a guide roller arranged in alignment with the path along which the web is transported;
   a pair of nipping rollers arranged after the guide roller;
   drive means for driving the nipping rollers; and
   a moving roller arranged between the guide roller and nipping rollers and adapted to guide the web in such a way that the web is transported along a U-shaped path.

6. A photo printer as claimed in claim 5, wherein a bridge piece movable together with the moving roller is arranged on the side opposite to the moving roller relative to the web so that the bridge piece is interposed between the guide roller and the nipping rollers when the web travels straight between the guide roller and the nipping rollers.

7. A photo printer as claimed in claim 6, wherein said photo printer is additionally equipped with a spring by which the moving roller is biased toward the web.

8. A photo printer as claimed in claim 1, wherein said photo printer is additionally equipped with cutter means between the exposure frame and exhaust feeding means for cutting the web into sheets.

9. A photo printer as claimed in claim 1, wherein the second magazine comprises:
   a housing defining an opening through which the web is fed in;
   guide rollers held rotatably inside the opening;
   spool means adapted to hold the leading edge of the web and displaceable between a first position where the spool means is maintained in contact with the guide rollers and a second position where the spool means is maintained apart from the guide rollers;
   guide means for guiding the displacement of the spool means;
   biasing means for urging the spool means toward the guide rollers; and
   drive means for rotating the spool means so as to wind up the web on the spool means.

* * * * *